United States Patent
Reverte et al.

(10) Patent No.: US 8,024,066 B2
(45) Date of Patent: Sep. 20, 2011

(54) AUTONOMOUS INSPECTOR MOBILE PLATFORM

(75) Inventors: Carlos F. Reverte, Miami, FL (US);
Scott M. Thayer, Pittsburgh, PA (US);
William Whittaker, Pittsburgh, PA (US); Eric C. Close, Sewickley, PA (US); Adam Slifko, Pittsburgh, PA (US);
Edison Hudson, Chapel Hill, NC (US);
Subramanian Vallapuzha, Pittsburgh, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 640 days.

(21) Appl. No.: 11/335,176

(22) Filed: Jan. 18, 2006

(65) Prior Publication Data
US 2006/0290779 A1 Dec. 28, 2006

Related U.S. Application Data (60) Provisional application No. 60/645,180, filed on Jan. 18, 2005.

(51) Int. Cl.
*G06F 19/00* (2011.01)

(52) U.S. Cl. ........ 700/245; 700/248; 700/257; 700/258; 700/259; 385/100; 385/101; 385/102; 385/103; 385/105; 318/568.16; 318/568.23

(58) Field of Classification Search ............... 700/245, 700/248, 257, 258, 259, 266, 281; 318/528.16, 318/568.23; 342/238, 240, 242; 367/25, 367/69, 86; 385/100, 101, 102, 103, 105, 385/106, 107, 109, 110, 112, 113; 405/132, 405/150, 183.5; 73/623
See application file for complete search history.

(56) References Cited

U.S. PATENT DOCUMENTS

| | | | |
|---|---|---|---|
| 3,562,642 A | 2/1971 | Hochschild |
| 3,672,785 A | 6/1972 | Byrne |
| 4,029,428 A | 6/1977 | Levens |
| 4,197,908 A | 4/1980 | Davis et al. |
| 4,431,017 A | 2/1984 | Willemsen |

(Continued)

FOREIGN PATENT DOCUMENTS

AT 397432 8/1993

(Continued)

OTHER PUBLICATIONS

Hirose et al., Design of In-pipe Inspection Vehicles phi25, phi50, phi150 pipes, 1999, IEEE, pp. 2309-2314.*

(Continued)

*Primary Examiner* — James P Trammell
*Assistant Examiner* — McDieunel Marc
(74) *Attorney, Agent, or Firm* — Reed Smith LLP (57) ABSTRACT

An autonomous inspector mobile platform robot that is used to inspect a pipe or network of pipes. The robot includes a locomotion device that enables the device to autonomously progress through the pipe and accurately track its pose and odometry during movement. At the same time, image data is autonomously captured to detail the interior portions of the pipe. Images are taken at periodic intervals using a wide angle lens, and additional video images may be captured at locations of interest. Either onboard or offboard the device, each captured image is unwarped (if necessary) and combined with images of adjacent pipe sections to create a complete image of the interior features of the inspected pipe. Optional features include additional sensors and measurement devices, various communications systems to communicate with an end node or the surface, and/or image compression software.

25 Claims, 8 Drawing Sheets

U.S. PATENT DOCUMENTS

| | | | |
|---|---|---|---|
| 4,437,526 A | 3/1984 | Gloor | |
| 4,442,891 A | 4/1984 | Wood | |
| 4,577,388 A | 3/1986 | Wood | |
| 4,613,812 A | 9/1986 | Gelston, II | |
| 4,630,676 A | 12/1986 | Long, Jr. | |
| 4,648,454 A | 3/1987 | Yarnell | |
| 4,675,604 A * | 6/1987 | Moyer et al. | 324/220 |
| 4,701,988 A | 10/1987 | Wood | |
| 4,765,173 A | 8/1988 | Schellstede | |
| 4,800,104 A * | 1/1989 | Cruickshank | 427/230 |
| 4,819,721 A | 4/1989 | Long, Jr. | |
| 4,822,211 A * | 4/1989 | Shinoda et al. | 405/183.5 |
| 4,862,808 A * | 9/1989 | Hedgcoxe et al. | 104/138.2 |
| 4,951,758 A | 8/1990 | Sonku et al. | |
| 4,955,951 A | 9/1990 | Nemoto et al. | |
| 5,044,824 A | 9/1991 | Long, Jr. et al. | |
| 5,088,553 A | 2/1992 | Ralston et al. | |
| 5,105,882 A | 4/1992 | Ralston et al. | |
| 5,150,989 A | 9/1992 | Long, Jr. et al. | |
| 5,195,392 A * | 3/1993 | Moore et al. | 73/866.5 |
| 5,272,986 A * | 12/1993 | Smart | 104/138.2 |
| 5,329,824 A * | 7/1994 | Carapezza et al. | 73/866.5 |
| 5,387,092 A | 2/1995 | Pettitt et al. | |
| 5,454,276 A * | 10/1995 | Wernicke | 73/865.8 |
| 5,565,633 A * | 10/1996 | Wernicke | 73/865.8 |
| 5,571,977 A | 11/1996 | Kipp | |
| 5,574,223 A * | 11/1996 | Kiefer | 73/623 |
| 5,577,864 A | 11/1996 | Wood et al. | |
| 5,608,847 A * | 3/1997 | Pryor | 700/248 |
| 5,736,821 A * | 4/1998 | Suyama | 318/16 |
| 5,742,517 A | 4/1998 | Van Den Bosch | |
| 5,773,984 A | 6/1998 | Suyama et al. | |
| 5,878,783 A | 3/1999 | Smart | |
| 5,947,051 A | 9/1999 | Geiger | |
| 5,947,213 A | 9/1999 | Angle et al. | |
| 6,031,371 A | 2/2000 | Smart | |
| 6,056,017 A | 5/2000 | Kamiyama et al. | |
| 6,162,171 A | 12/2000 | Ng et al. | |
| 6,175,380 B1 | 1/2001 | Van Den Bosch | |
| 6,243,483 B1* | 6/2001 | Petrou et al. | 382/103 |
| 6,377,734 B1 | 4/2002 | Mayr et al. | |
| 6,386,797 B1 | 5/2002 | Gearhart | |
| 6,405,798 B1* | 6/2002 | Barrett et al. | 166/250.01 |
| 6,427,602 B1 | 8/2002 | Hovis et al. | |
| 6,446,718 B1* | 9/2002 | Barrett et al. | 166/250.01 |
| 6,450,104 B1 | 9/2002 | Grant et al. | |
| 6,697,710 B2* | 2/2004 | Wilcox | 700/245 |
| 6,745,955 B2 | 6/2004 | Kronz | |
| 6,845,819 B2* | 1/2005 | Barrett et al. | 166/250.01 |
| 6,964,309 B2* | 11/2005 | Quinn et al. | 180/8.1 |
| 7,009,698 B2 | 3/2006 | Drost et al. | |
| 7,042,184 B2 | 5/2006 | Oleynikov et al. | |
| 7,069,124 B1* | 6/2006 | Whittaker et al. | 701/28 |
| 7,073,979 B2 | 7/2006 | McGrew et al. | |
| 7,126,303 B2 | 10/2006 | Farritor et al. | |
| 7,131,791 B2* | 11/2006 | Whittaker et al. | 405/184.2 |
| 7,137,465 B1 | 11/2006 | Kerrebrock et al. | |
| 7,210,364 B2 | 5/2007 | Ghorbel et al. | |
| 7,460,980 B2* | 12/2008 | Hinn | 702/151 |
| 7,594,448 B2* | 9/2009 | Jacobson et al. | 73/865.8 |
| 7,680,625 B2* | 3/2010 | Trowbridge et al. | 702/182 |
| 2002/0062177 A1 | 5/2002 | Hannaford et al. | |
| 2003/0089267 A1 | 5/2003 | Ghorbel et al. | |
| 2003/0172871 A1 | 9/2003 | Scherer | |
| 2003/0198374 A1 | 10/2003 | Hagene et al. | |
| 2003/0216836 A1 | 11/2003 | Treat et al. | |
| 2004/0088080 A1 | 5/2004 | Song et al. | |
| 2004/0175235 A1 | 9/2004 | Whittaker et al. | |
| 2006/0074525 A1* | 4/2006 | Close et al. | 700/245 |
| 2006/0290779 A1* | 12/2006 | Reverte et al. | 348/84 |
| 2007/0153918 A1* | 7/2007 | Rodriguez | 375/240.29 |
| 2009/0037146 A1* | 2/2009 | Trowbridge et al. | 702/184 |
| 2010/0218624 A1* | 9/2010 | Atwood et al. | 73/865.8 |

FOREIGN PATENT DOCUMENTS

GB    2091611    8/1982

OTHER PUBLICATIONS

Kawaguchi et al, An efficient algorithm of path planning for an internal gas pipe inspection robot, 1992, IEEE, pp. 1155-1160.*
Bertto et al., Robot flessibile a basso costo per ispezioni tuni, 2001, Internet, pp. 1477-1483.*
Torboin, Advanced Inspection Robot for Unpiggable Pipelines, 2006, Internet, pp. 1-9.*
Großmann et al., A Robot Control System Integrating Reactive Control, Reasoning, and Execution Monitoring, 2002, Internet, p. 1-16.*
Musliner et al., Execution Monitoring and Recovery Planning with Time, 1991, p. 1-4.*
Jeng et al., Reliable automated manufacturing system design based on SMT framework, 1998, Internet, p. 1-27.*
Torbin et al., Advanced Inspection Robot for Unpiggable Pipelines, 2006, Internet, p. 1-9.*
Schempf et al., Neptune: Above-Ground Storage Tank Inspection Robot System, 1995, IEEE, p. 1-7.*
Jin-Wu et al., A Pipeline Inspection Micro Robot Based on Screw Motion Wheels, Internent, 2000, p. 1-4.*
Kawaguchi et al., Internal Pipe Inspection Robot, 1995, IEEE, p. 1-6.*
Ryew et al., Inpipe Inspection Robot System with Active Steering Mechanism, 2000, IEEE, p. 1652-1657.*
Ono et al., Development of an In-pipe Inspection Robot Movable for a Long Distance, 2001, Internet, p. 1-4.*
Choi et al., Development of Articulated robot for Inspection of Underground Pipelines, 1999, Internet, p. 1-8.*
"EPA Collection Systems O&M Fact Sheet Sewer Cleaning and Inspection", United States Environmental Protection Agency, Office of Water, EPA 832-F-99-031, Sep. 1999.

* cited by examiner

AUTONOMOUS INSPECTOR MOBILE PLATFORM

CROSS-REFERENCE TO RELATED APPLICATION

This application claims the benefit under 35 U.S.C. §119(e) of the earlier filing date of U.S. Provisional Application Ser. No. 60/645,180 filed on Jan. 18, 2005.

BACKGROUND OF THE INVENTION

1. Field of the Invention

The present invention relates generally to robotic devices and methods for inspecting and mapping the interior of pipes and pipe networks, and, more specifically, the present invention is directed to autonomous pipe inspection robots that navigate through pipe networks gathering image data for forming a complete picture of the network, and methods for utilizing the same.

2. Description of the Background

The oldest pipes in the United States date to the late 1800's, and the average non-rehabilitated water and sewer pipe is more than 50 years old. However, depending on the type of material used, pipe operating life ranges from only 50 to 125 years. Much of the existing pipe, therefore, needs to either be replaced or rehabilitated (relined or otherwise repaired) in short order.

A major problem in the U.S. sewer systems is inflow and infiltration ("I&I"). I&I is caused by the inflow of rainwater into the sewer system due to heavy rains and/or the fact that many sewer lines lie below the water table. I&I increases costs at sewage treatment plants, and, in a number of cases, the additional water injected during a rainstorm outstrips the capacity of treatment plants. This often results in the diversion of raw sewage into rivers and streams.

Along the same lines, the biggest problem in the U.S. potable water system is leaky pipes. For example, estimates hold that 35% to 50% of drinking water in the U.S. is unaccounted for once it leaves a water treatment facility, the vast majority of which is lost through leaky pipes. The urgent need to rehabilitate water pipes exists to reduce water leakage from the system, reduce costly emergency break repairs and increase water quality at the consumer's tap.

Government regulation is also increasing in these areas. In June 1999, the GASB (Government Accounting Standards Board) issued "Statement 34" requiring state and local governments to report the value of their infrastructure assets such as buried pipes, storm sewers, bridges and roads. Additionally, the EPA is actively pursuing consent decrees—forcing cities to eliminate sewage overflow into rivers and other bodies of water during heavy rainfalls and to increase water quality nationwide. Finally, the Safe Drinking Water Act, first passed in 1974, requires municipal water suppliers to guarantee that the water quality at the tap is the same as the water quality at the purification plant. The decay, sediment and leakage taking place in either water pipes or water storage tanks accounts for impurities in drinking water that enter the system after the water leaves the water purification plant, and prevents the satisfaction of these government regulations.

In general, the three main functions required to maintain our piping infrastructure are: (1) cleaning; (2) inspecting; and (3) rehabilitating. Cleaning involves the removal of obstructions and debris that blocks the flow of water and sewage. Inspecting involves mapping the pipe interior, characterizing the pipe's defects, and developing a maintenance plan for the pipe. Rehabilitating the pipe involves maintaining and fixing faulty piping.

In total, there are over 1.2 million miles of sewer pipe in the United States. Over time these pipes deteriorate—the pipes crack and corrode and the pipe joints become dislodged—requiring replacement or refurbishment. Traditionally, pipes have been replaced, repaired or refurbished using "trenched" methods. In trenched methods, the land above the targeted pipe is removed along its entire length, typically with an excavator. This often requires closing a roadway and removing the earth and pavement underneath it, which is later replaced at great cost.

Alternatively, in trenchless methods the pipe is accessed via manholes—or in some instances by digging access holes at both ends of the pipe—and is repaired/refurbished via relining or grouting. In most cases, trenchless technology completely eliminates the need to dig up roads and land and is significantly less expensive. As a result, trenchless methods are rapidly gaining market share and are becoming the preferred methods in the U.S. and throughout the world. Generally, old trenched methods are still employed only when specification engineers are not trained in trenchless methods or the subject pipe is so deteriorated it requires the dig and replace method (which is only required a small percentage of the time).

Although they are gaining momentum, traditional (i.e., current) trenchless pipe rehabilitation methods are quite limited. For example, contractors currently use dedicated trucks equipped with remote controlled video capture systems typically mounted on small wheeled or tracked platforms. Such systems typically cost over $100,000 and are highly specialized to the task. These mobile camera platforms trail a wire tether to bring control signals and power for the platform motors and camera from the truck, and to return video signals to be recorded on tape in the truck. The operator directs the view of the camera and the forward motion of the platform that carries it. During the process of inspecting, the operator continuously views the image, stopping to classify features such as laterals, and defects in accordance with descriptive industry standards. The efficiency of this approach is limited by the embedding of the classification process and the platform controls within the task of collecting video data. There is also a high degree of variability in the classification results depending on the skill and experience of the operator.

New robotic devices and methods are continually sought to address these and other limitations of the prior art. Specifically, robotic devices that can perform inspection and surveillance of subterranean or otherwise located pipes that are difficult to access without the need for extensive operator interaction are greatly desired. The present invention, in its many preferred embodiments addresses these and other limitations of the prior art.

SUMMARY OF THE INVENTION

In at least one preferred embodiment, the present invention provides robotic devices and systems for allowing for the streamlined and low cost inspection and surveillance of pipes and pipe networks using trenchless methods. An autonomous robot, which may be untethered or tethered for mechanical, communications and/or power, is deployed within the pipe (for the purposes of this application, the word "pipe" includes any hollow or semi-enclosed void into which a robot may be inserted for mapping or imaging purposes). Once deployed, the robot navigates through the pipe capturing image data (either still pictures or video) at periodic intervals (or continuously) to form a complete picture or map (2D or 3D) of the interior structure of the pipe. This complete image data can then be automatically (by a computer) or manually (by a human) reviewed to determine the condition of the pipe and the existence of one or more defects that need to be addressed.

At their core, the methods of the present invention segregate the tasks of video/image collection from the task of operator review and classification—tasks that traditionally were performed in tandem. Through the use of the inexpensive and easily deployed/operated robots of the present invention, a single operator (or small team of operators) can deploy and utilize a plurality of different inspector robots at different locations (e.g., at successive sections of pipe between manholes) to simultaneously gather image data from the plurality of locations.

Figure 1:
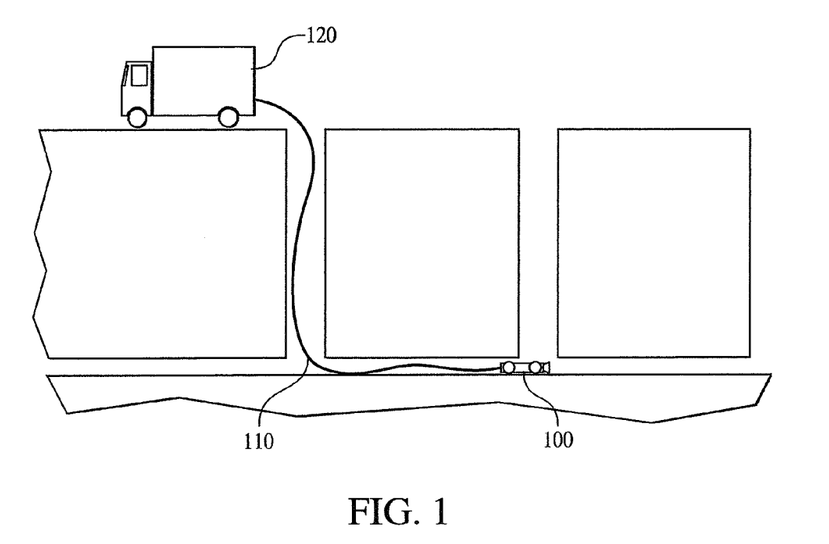
FIG. 1 shows a conventional tethered inspection robot within a pipe.
Figure 2:
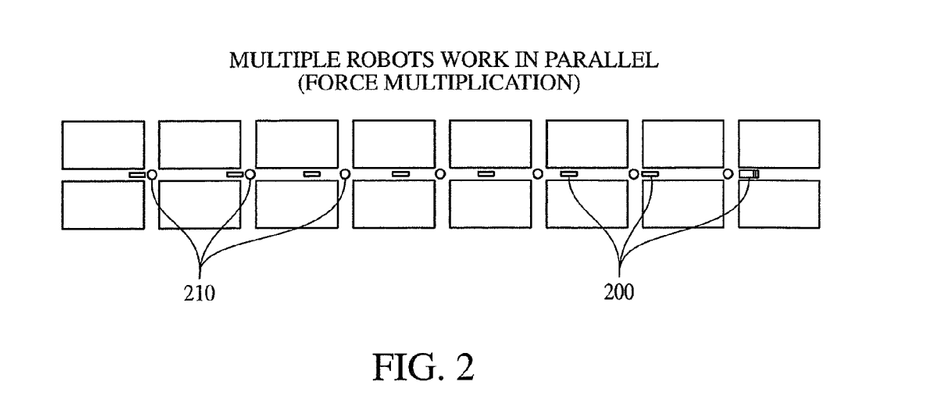
FIG. 2 shows a plurality of inspection robots working in parallel according to the present invention.

FIGS. 1 and 2 show one particular advantage of this system. In the traditional method of FIG. 1, an operator at a surface-bound truck 120 controls a single inspection robot 100 via a communications and power tether 110. The operator is key to control and inspection in this process, and a single operator can manipulate only a single robot at any one time. In the present method shown in FIG. 2, a plurality of inspection robots 200 have been inserted through a plurality of manholes 210 into adjacent sections of a pipe. Since no operator control and interaction is required, the single operator can inspect multiple sections of the pipe simultaneously, using multiple robots 200.

After data capture, computer software is then used to put together the image data from the plurality of different robots into a single, coherent pictorial description of the pipe that can be efficiently reviewed by the operator. If wide angle ("fish eye"/spherical/panospheric) lens cameras are used to capture the data, each individual image may need to be unwarped and joined with image data of adjacent portions of the pipe using known imaging techniques. Video and/or still pictures may be used alone or in combination with each other.

In addition to the primary tasks described above, the robot of the present invention may include a variety of different sensors, sample collections means and other payload to carry out a wide variety of other tasks related to pipe inspection. For example, samples of water from within the pipe could be collected, or various pipe environmental attributes (e.g., pressure, temperature, liquid pH level) could be measured and logged at various locations within the pipe. These and other advantages, features and orientations of the present invention are discussed more fully in the following detailed description of the preferred embodiments.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present invention is generally directed to an autonomous robotic camera for pipe infrastructure inspection with an optional dual use as a surveillance platform. Specifically, the autonomous inspector mobile platform ("AIMP") is a compact, autonomous mobile robot that performs imaging and inspection of pipe and pipe networks (including main lines and interconnecting laterals). As described above, operators traditionally inspect pipe by manually "driving" (through teleoperation) a camera tractor down a pipe and recording video that is sent back to the surface via a tether. This traditional method consumes the entirety of an operator's time and attention, and the review of video to identify and classify defects in the pipe is laborious and inefficient. Long-term archival of video is expensive and information retrieval is cumbersome. Moreover, large trucks and equipment are required to support the camera and operator during inspection.

The present method utilizing AIMP is a distinct improvement over these traditional methods. For example, expensive video platforms and supporting vehicles are replaced by a fleet of low-cost robots that can be deployed out of a pick up truck and managed with a laptop computer (see FIG. 2). The autonomy of these robots increases imaging throughput by removing the human from the information loop, allowing a single operator to deploy multiple robots that simultaneously map multiple pipes. Images collected during one or more pipe mapping runs are then stitched together by computer software to generate a synthetic, unwrapped pipe image that can quickly be reviewed by humans or computers, and can easily be archived for later use. It is the simplicity and streamlined aspects of the present robotic system, combined with the claimed functionality, that provides the greatest advantage over the prior art.

The Robot Generally

Figure 3:
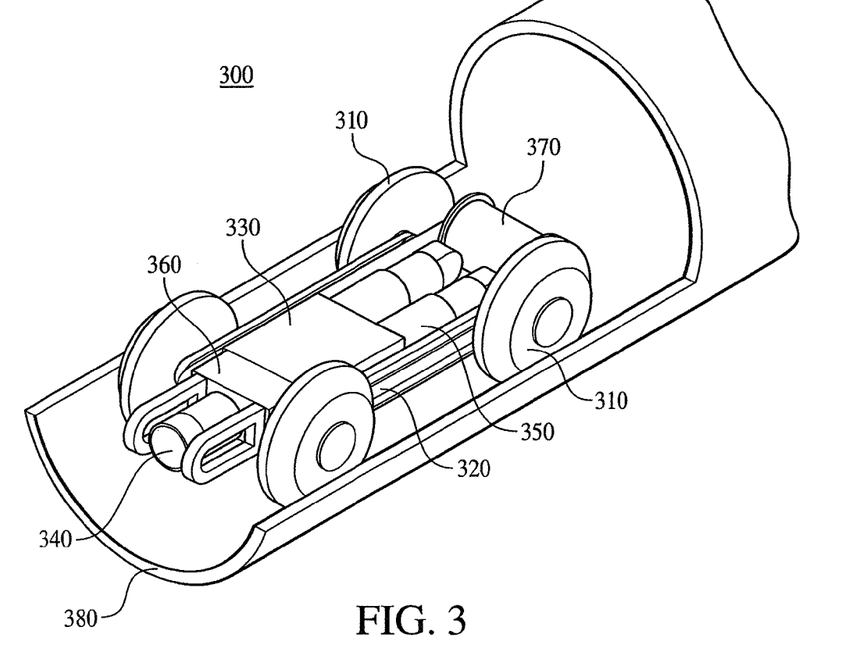
FIG. 3 details one exemplary embodiment of a 4 wheeled autonomous inspector robot.

The AIMP is an un-tethered, self-contained mobile robot with onboard power, imaging and autonomy. In one exemplary embodiment, it is based around a 4-wheeled, skid-steering, invertible chassis that can traverse minor blockages and pipe steps and can image pipes of, for example, 6"-12"

diameters. FIG. 3 shows a perspective view of an exemplary invertible chassis robot 300 according to the present invention.

In FIG. 3, the robot 300 is shown with four wheels 310 which are mounted to an invertible chassis 320. The chassis 320 also includes a pair of drive motors 350 for moving the robot, a computer 360 for controlling the robot and its attachments, and an onboard battery 330 for supplying power to the robot and its components (including the drive motors 350). In this embodiment, the robot 300 is shown with a single forward-looking camera 340 which is movably mounted to the chassis 320. Preferably, the computer 360 is capable of directing the camera 340 in different directions inside the pipe 380, as necessary.

Optionally shown in FIG. 3 is an odometry tether 370 attached at the rear of the robot 300. As described in more detail below, this tether, which is purely optional, may provide a variety of different functionalities to the robot 300. For example, in its simplest form, the tether 370 is a monofilament that mechanically anchors the robot to a fixed position in the pipe network. This fixed position can be used to determine odometry (linear distance from the fixed point) and may be used to physically recover the robot 300 upon failure. This type of robot would be characterized by onboard power and data storage. In alternative embodiments (again as described in more detail below), the tether may also include communications signals (for example to communicate with an end node within the pipe network) or power signals to be supplied to the robot 300. An almost limitless variety of tethered and non-tethered embodiments are included within the teachings of this application.

The robots of the present invention are generally freed of towed-tether related drag and snag issues, allowing the robots to have equal or better mobility than traditional camera-based robots, while having a smaller chassis profile and lower power consumption. The compact design can sometimes allow it to bypass obstacles that would preclude access by larger vehicles. The robot is also preferably waterproof (e.g., to IP68, positively pressurized) so it can drive through flooded pipe bellies and is easily disinfected by immersion in a cleaning solution after use.

Figure 11A:
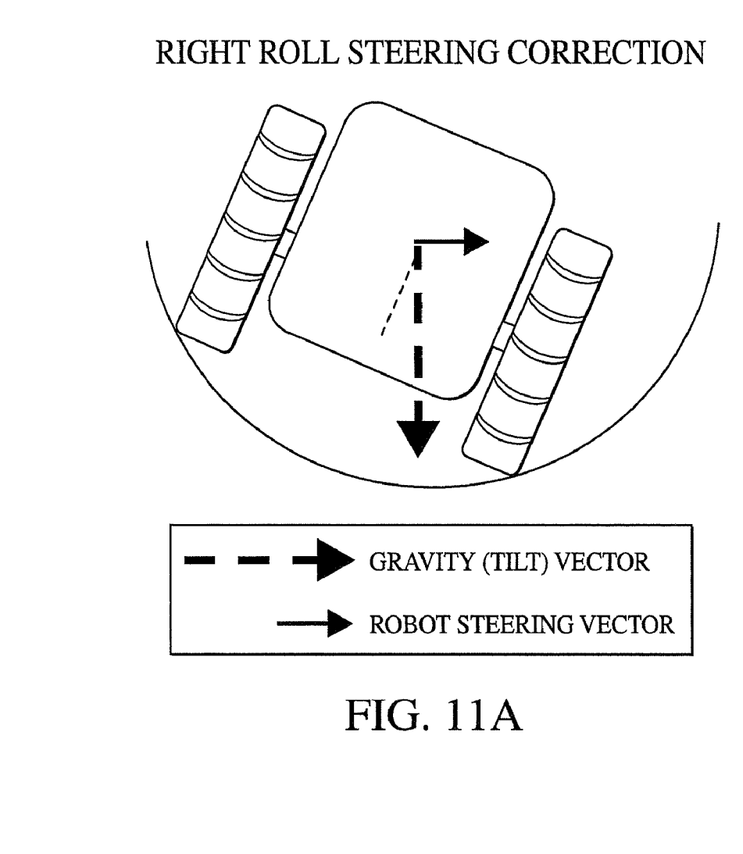
FIG. 11 shows rear views of an exemplary inspector robot to illustrate a steering methodology for a right turn (FIG. 11A) and a left turn (FIG. 11B).
Figure 11B:
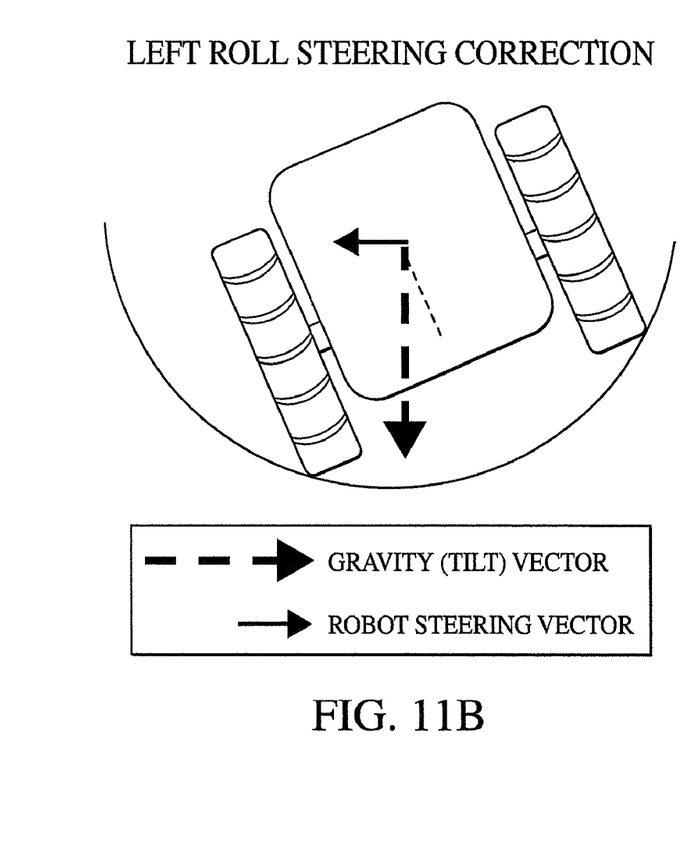

The robot's computer controls driving and imaging through the entire inspection run without in-use interaction from an operator at the surface. The onboard computer preferably uses tilt-sensing to stay centered in the pipe and to drive around pipe bends and obstacles without complex sensing. For example, FIG. 11 shows two examples of tilt sensing being used to navigate a robot 1100 into a right turn (FIG. 11A) and a left turn (FIG. 11B). In FIG. 11A, the vector diagram shows that a tilt sensor can sense the tilt of the robot 1100 in relation to gravity and therefore easily determine that a right turn should be implemented until the tilt sensor registers no tilt.

Likewise, in FIG. 11B, the vector diagram shows that a tilt sensor can sense the tilt of the robot 1100 in relation to gravity and easily determine that a left turn should be implemented until the tilt sensor registers no tilt. In this way, because of the generally predefined nature of cylindrical pipes, a simple tilt sensor arrangement can be used to send the robot down the length of a pipe without having any prior knowledge about the path of the pipe. The robot merely responds to a general profile or attribute of the pipe in a regular manner. This simplifies the navigation process and helps to remove the need for an operator to view video of the robot as it traverses down the pipe and to make decisions based on that video about robot locomotion.

In addition to this locomotion tilt sensing, various proximity sensors may provide the robot safety against falls if the pipe ends in a drop-off. Moreover, a microfilament safety line (tether) may be anchored to the manhole cover (or another anchor location) at the ingress point to enable recovery in case of entrapment or robot failure. As the robot drives, the safety line is payed out from an onboard spool while a spool encoder and take-up motor provide accurate odometry by measuring the amount of line fed. If the robot has locomotion difficulty due to an irregularity in the pipe or an internal failure, it may use the tether to winch itself out of difficulty or back to the ingress point for retrieval by the operator.

Apart from the simplified locomotion, imaging of the interior portions of the pipe or pipe network is also of critical importance to the present invention. Imaging is preferably performed while driving down the pipe by taking still pictures with a wide angle camera (e.g., camera 340 in FIG. 3) at short intervals (e.g., every 3"-6") so that there is overlap between successive images. As each image is taken, the image is stamped with odometry and pose information and is stored onboard the robot (or, in some embodiments, is communicated to an end node or the surface). After the run, if the images are from a "fisheye" or panospheric lens, the images are unwarped into local cylindrical views of the pipe using conventional imaging software, and the overlapping sections are stitched together by a computer algorithm to automatically generate a synthetic image of the whole pipe. The inspector can also review the images for a traditional "down pipe" view of any encountered obstructions or traps (but this is not mandatory in order to control the robot).

In order to use the robot of this preferred embodiment, the robot operator (a human) uses mission planning software on a laptop computer to coordinate robot deployment, retrieval and image gathering. The robot or robots are configured automatically through a computer uplink at a truck at the surface (e.g., to a laptop computer). This connection also charges the rechargeable power source onboard the autonomous robot.

As shown in FIG. 2, each of the plurality of robots 200 is capable of inspecting and gathering image data related to one contiguous section of pipe between two adjacent manholes. Therefore, a plurality of robots can be deployed simultaneously to map a long section or a network of pipe (including laterals off of a main). Once the inspection plan is developed, the operator deploys a robot through the first manhole and starts the run. When the robot starts driving according to its plan, the operator is free to close the manhole cover and proceed to the next manhole to start the operation of a second robot, working in parallel with the first. If any of the robots encounters a blockage that it cannot progress beyond or around, the robot will record the obstacle and return to the point of ingress.

Once each of the robots has completed its run or mission, the operator returns to collect the robots and download their image data to a central location (e.g., the laptop) through a communications medium such as a serial port. The images are then processed on the laptop to generate the synthetic pipe maps which can be reviewed on site or sent to a processing center for further analysis.

Automated Camera—Imaging

At the heart of the present invention is the robot camera system for capturing image data to map and inspect a pipe or pipe network. The robot platform takes advantage of known digital image capture techniques to stitch together a 360 degree high resolution map of the pipe interior. The resolution of this image will typically be an order of magnitude better than current video methods, allowing for a better final result and analysis. For example, features as small as 0.05 of an inch can be resolved with this method, allowing some hairline cracks to be detected that might not be visible with the current analog camera systems. In most cases, prior pipe cleaning may not be required due to an advanced terrain compliant locomotion system that is capable of going through or around debris within a pipe.

Images are generally captured in discrete sampling intervals and stored onboard to be later used in an offboard (not on the robot) processing step. After the mission, the images will be downloaded from the robot, unwarped, and stitched together to generate a synthetic unwrapped view of the whole pipe. This synthetic image makes pipe review and inspection very quick and easy. The robot may also capture video and/or sound data at selective intervals to evaluate pipe flow and inflow and infiltration. The robot may even include onboard image processing for autonomous navigation, inspection, and feature identification. Features of interest can be imaged and videoed with greater detail, for example by repositioning the robot for a better vantage point from which to capture the image data.

Figure 6:
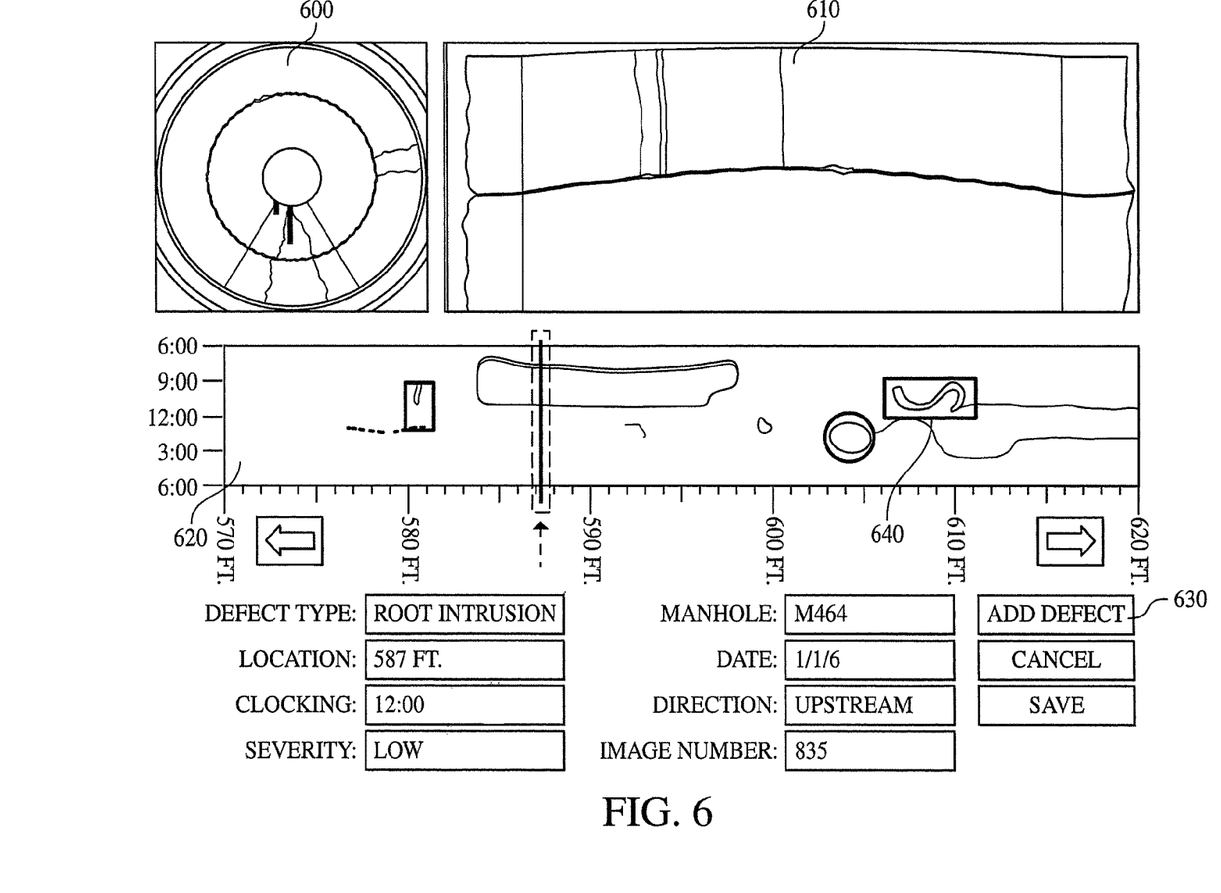
FIG. 6 details an exemplary operator interface screen.

Additionally, a user interface, such as the exemplary user interface shown in FIG. 6, may also facilitate quick pipe analysis and access to the raw source images for a virtual pan and tilt capability. This exemplary user interface shows three primary views in addition to the user controls. The three primary views include the source image view 600; the unwarped image view 610; and the synthesized image view 620. Generally, the source view 600 displays the raw data as captured from the pano/fish eye lens and presents it to the user as captured. This image is obtained from a single station within the pipe. The source view can be static as in the display of a single image or it can be used like a VCR to display a movie of successive warped images.

The unwarped view port 610 displays the unwarped version of the source image (600). The unwarped view 610 is a projection of the spherical or panospheric image onto a cylinder model of the pipe. The cylinder is then opened and flattened onto the plane to provide the unwarped view 610. Again, this view can be displayed in the same static frame or movie mode as the source view 600. Preferably, the source image (600) and unwarped image (610) views are synchronized such that they always display the same image data—when one frame moves in time, the other responds accordingly.

Finally, the synthesized view 620 hosts a multitude of unwarped images (610) that are synthesized into a common view 620. This view 620 is then tied to the odometry system of the robot such that the data is indexed by position of the robot in the pipe at the time of acquisition. Pipe defects are annotated by the interface controls (such as the "Add Defect" button 630) and may be highlighted in the synthesized view (shown as box 640 in FIG. 6) to improve visibility. The operator can annotate defects in any of the views and the defect classification data will automatically be displayed and archived in the synthesized view 620. Moreover, annotated data can be exported to work with other computer software or robotic systems. Additional exemplary user controls and readouts are shown in the lower portion of the user interface of FIG. 6. Moreover, other readouts, including the states of all of the optional sensors (e.g., temperature, pressure) and other devices may also be included on the user display.

In addition to the navigation and imaging features described above, other optional features may be incorporated into one or more embodiments of the present invention. For example, these optional features of the robot may include a means for inspecting lateral pipes (see FIG. 8), either with an arm or other actuator that can deploy a mobile camera or by driving up the lateral pipes with the robot. Likewise, more sophisticated manhole identification and the ability to inspect runs longer than a single manhole span provide the ability to explore and inspect whole pipe networks with no prior knowledge of the infrastructure of the network.

Alternative Preferred Detailed Features of the AIMP

The present invention preferably utilizes a flexible foundation architecture for an autonomous inspection and surveillance robot. The robot supports expansion/interchangeability of parts and components, and the control system supports extension and reconfiguration to maximize the design's utility across a range of potential applications using the base concept of a "manual deploy/autonomous data capture/fetch" robot methodology. The following features and orientations are exemplary in nature and do not limit the scope of the present invention, as claimed.

As generally shown in FIG. 3, the body of the robot is preferably compact, for example measuring no more than about 10"×3"×4" to allow the robot to be useful in a wide array of pipes and further to allow the robot to pass through pipes that are even partially obstructed. The outer portions of the body are streamlined to prevent snagging debris and for ease of cleaning. The body also preferably includes a transparent dome over the one or more onboard cameras or imaging devices, and the dome includes a "wiper" to maintain clarity of the dome even in harsh working conditions. As stated above, the entire body of the robot may be water/air tight in order to be adaptable to wide array of gas/liquid filled pipes and for ease of cleaning. To maintain these seals, the robot is preferably sectioned into discrete modules which are each individually water/air tight (as opposed to merely a monolithic air-tight hull) to increase reliability and to ease troubleshooting, design and manufacture of the robot.

Figure 4:
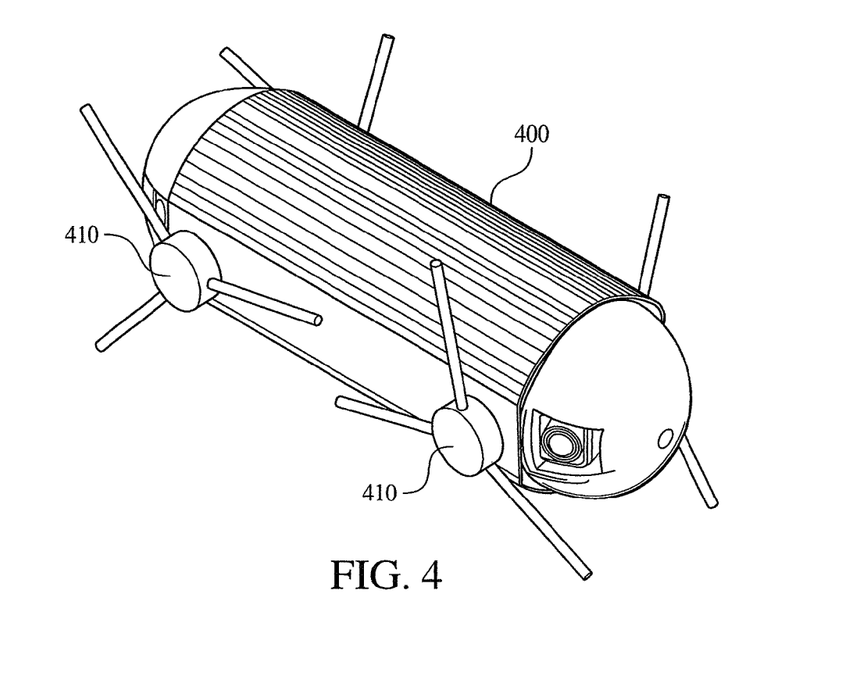
FIG. 4 details an exemplary inspector robot including WHEGS for locomotion.

For locomotion, the robot preferably includes removable/replaceable wheels and other locomotive devices. For example, different sized wheels with different wheel bases may be used for various applications (FIG. 3). Additionally, wheeled legs ("WHEGS") as shown at 410 on robot 400 in FIG. 4, or a rough terrain propulsion system may be utilized. The robot may include a conventional independent suspension multi-wheel array, an articulated track or tread design, a propeller or other water-ready propulsion system or any other commonly known locomotion system according to the specifications of the job.

In addition to various wheels and treads, the robot is generally characterized by a low center of mass, wide body construction to minimize the risk of the device flipping within the pipe. Moreover, an invertible chassis (that can operate when flipped over) may be used to eliminate the risk of flipping altogether. Importantly, locomotion is preferably undertaken using a split-body chassis ("body-averaging"). Specifically, left and right chassis are linked together by a central, passive, transverse-mounted rotary joint. With this system, the robot can conform to variable terrain and concave surfaces with even wheel load and traction. In other words, without any preconceived notions about direction of travel, the robot can easily follow the predictable curves of a pipe network, whichever way the pipes may turn. This scheme is described above and generally shown in FIG. 11.

Also, a wide variety of image sensors can be utilized within the scope of the concepts of the present invention. Preferably, a low cost imaging system with sufficient image resolution, field of view (FOV) and storage efficiency will be utilized. Among other well-known types of imaging devices which may be used with the present invention, the robot may include: a forward-looking camera, a wide FOV camera ("i.e., "fisheye" lens); a panospheric camera; a scanning camera with image stitching and mosaicing; a 360° imaging capable camera with programmable range of interest; a 360° advanced optics camera; multiple low resolution sensors with multiplexed integration; and/or a high resolution solid state imager. Each of these devices requires both a light source and a data storage device.

For use with the imaging devices described above, the robot preferably includes control capability to digitize the data at the imager source to enhance the SNR of the image to, for example, 50 db. The resolution of the image capture device may be as high as 0.005" and is preferably selectable with capture time tradeoff (higher resolution images take longer to capture). The robot may include high contrast, high intensity strobe illumination (to be turned on only during image capture) and may include a dual camera system with lighting provided on a single servoed beam. If necessary for complete image capture, the camera itself may be servoed for directional control of the camera. Moreover, each of the cameras may be still or video (depending on the desired use), and they may provide stereo imaging functionality for 3D data creation.

In addition to the optical domain imagers described above, the robot optionally integrates additional, structural spectrum imagers to aid in structure identification and/or mapping. For example, the structural spectrum imagers may take the form of: structured light; LADAR; flash LADAR; sonar (for submerged pipe environments; (mechanical sensors such as whiskers and float sensors); a pose in pipe estimate from a two camera system; ultrasound; and/or ground penetrating radar which can be used by looking for fill cavities in the ground surrounding the robot. These additional imagers may provide additional or alternative recognition of the internal features and environment of the pipe or pipe network.

The robot of the present invention also incorporates some type of odometry, pose and navigation sensors or controls. Accurate odometry and pose (orientation within the pipe) estimation are essential for image sampling, navigation and post-mission image reconstruction. The robot preferably leverages the highly structured (i.e., predictable) nature of pipe environments to navigate autonomously using very simple and primarily proprioceptive sensors. Although a higher fidelity of navigation may be achieved with additional sensing options, the simplicity of the proprioceptive sensor approach allows for the robot to be built with decreased power consumption and onboard hardware/software for navigation, instead focusing the robot's computer power and payload on inspection and mapping tasks.

Many different types of pose/odometry sensors may be incorporated into the robot. For example, the robot may include: a drive wheel encoder for dead reckoning; accelerometers/IMU; tilt sensors; gyroscopes; magnetometers; and/or proximity sensors. As described in more detail below, an anchor line with a payout spool (with the spool either onboard the robot or offboard in the pipe or at the surface) may be used for precise determination of odometry. The orientation and pose of the robot may be determined using these tools and well known computational algorithms to determine geometry from motion, from stereo differencing and/or from rotating aperture 3D imagers.

Figure 9:
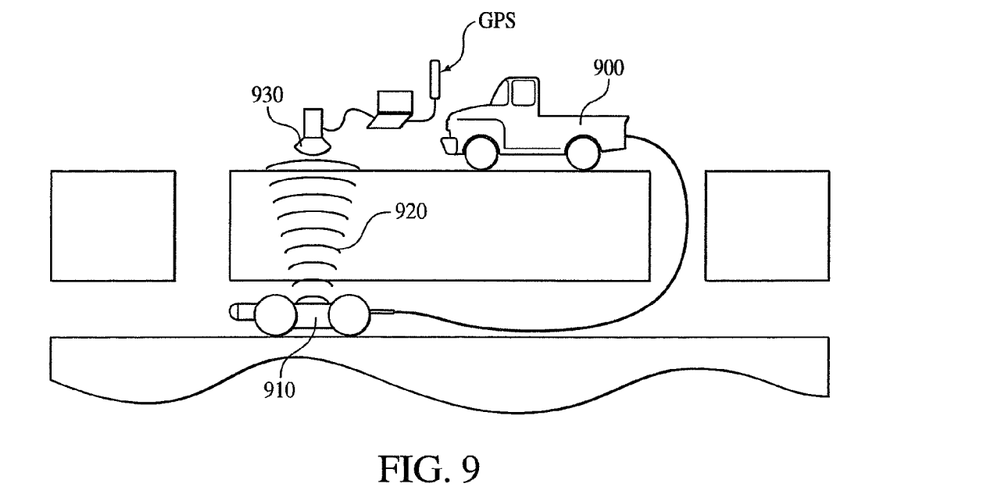
FIG. 9 details a robot utilizing electromagnetic waves for location/positioning emitted from the robot.
Figure 10:
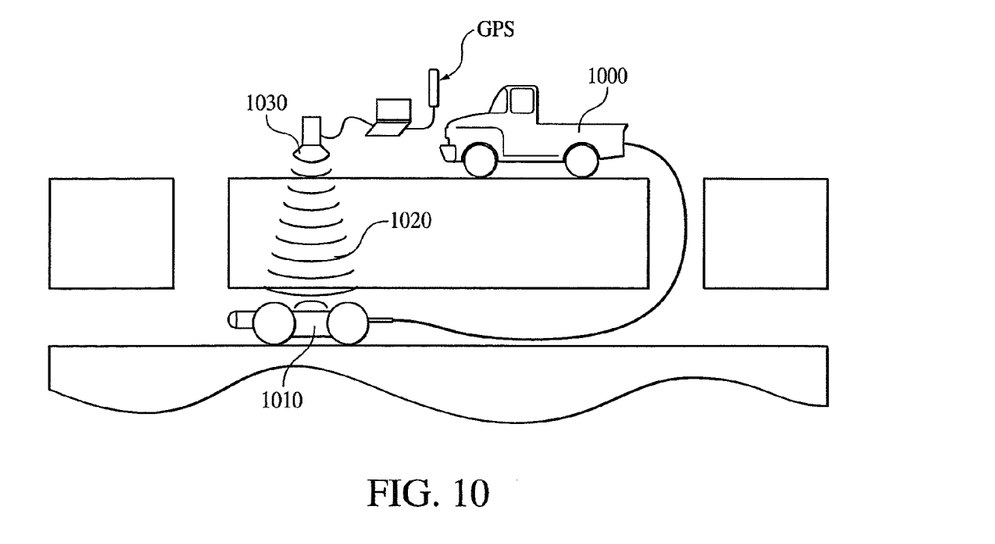
FIG. 10 details a robot utilizing electromagnetic waves for location/positioning emitted from a surface emitter.

One unique position sensing algorithm of a preferred embodiment of the present invention is based in part on electromagnetic waves such as those emitted by global positioning satellites or GPS. FIGS. 9 and 10 shows exemplary robots utilizing GPS in combination with ground penetrating radar or other low frequency radio waves that travel through solid rock. As shown in FIG. 10, it is possible to control the robot 1010 via the emission of an electromagnetic signal 1020 from an emitter 1030 at the surface. An on-board receiver could simply servo to the amplitude of the signal. By moving the source (1030)—you could force the robot 1010 to move forward, backward, or perhaps even turn around. This device could be modulated/de-modulated to send low-bandwidth control signals to the robot. For example, simple codes telling to return home, continue to the next manhole could be devised. Moreover, this could be coupled with a surface-based GPS receiver that could provide an absolute positioning reference for the system as a whole (or any feature within the system).

In converse to that shown in FIG. 10, the robot 910 in FIG. 9 emits an electromagnetic signal 920 from the robot 910 that can be localized by electromagnetic receivers 930 on the surface. Surface receivers of this signal can be used for a multitude of operations. For example, it is possible to monitor the progression of the robot from the surface and to know exactly when the robot has finished its autonomous run.

Moreover, it is possible to process the received signals 920 during robot motion through the pipe such that a model of the robots traversal through the pipe is constructed. Accordingly using some simple assumptions about robot motion in the pipe, a complete 3D model of the pipe can be constructed. This model can be used for the purposes of locating and mapping buried infrastructure that is hosting the robot. If the end points of the run, i.e., the manhole locations, have been surveyed and/or the surface receiver has a GPS receiver (as in FIGS. 9 and 10), it is possible to absolutely geo-reference the entire pipe run. This combination of low frequency communication through the ground coupled with the absolute positioning of GPS above ground provides a unique advantage over any prior art system.

The autonomous inspector mobile platform robot may also include other optionally integrated sensor payloads to accommodate certain pipe environments and to amplify the benefits of the inspection data process. Some of these optional payloads include: the continuous capture and digitization of sound, sonar heads for underwater inspection, and temperature, humidity, pressure, water composition and pH sensors and sample gathering mechanisms. The robot may also include sensors to measure water level, water speed and flow (e.g., to sample the flow rate in active pipes). The robot may also include a densitometer for measuring the opacity of a liquid or any of a variety of other analog variable measuring devices which can be easily incorporated into the control board of the robot, as explained more fully below.

In order to facilitate image capture and other functions, the robot is able to support a wide variety of actuators and lighting devices. For example, the robotic platform supports a range of simple actuators, in particular appropriate closed loop servo motors (to control the camera, light or another device). In order to achieve the recommended power efficiency, small motors with efficient gearing are used to achieve a modest traversing speed that maximizes range of operation. Other actuators may be supported if needed for a particular sampling device or sensor.

Likewise, lighting optimization for image quality and power utilization is an important subsystem of the robot. Preferably, pulse LED illumination that reduces power consumption to periods of image acquisition are utilized, but with the flexibility to use these or an alternative light source in continuous mode to capture video at certain locations within the pipe or pipe network.

The control system of the present invention is characterized by a single, power efficient computer-based embedded controls system, working in combination with one or more communication media. For example, IEEE 1394 (FireWire)

is supported to allow for quick image data download (typically only a few seconds for an entire run's worth of image data). If desired, the robot may also include a lightweight tether for teleoperation, real-time video, and/or sensor telemetry of the inspection robot in certain circumstances. In some embodiments, ground penetrating, low frequency radio communications (e.g., cave radio) may also be used to communicate with the robot.

The computer-based control system is responsible for image data storage and possibly analysis. It preferably includes programmable image resolution control with software upgrade capability for function enhancement or job-to-job optimization. As part of its programming, the control system preferably includes a recovery and remedial algorithm to handle blocked passages, closed loop motion control and camera/lighting and intelligent power management to monitor and maximize battery life, with prioritization to reserve enough battery life to return the robot to the drop-off (ingress) point. For imaging, the control system preferably includes digital image capture storage FLASH based on solid state memory and an image compression algorithm to optionally compress the captured image data, on the fly, into a common format such as JPEG or MPEG. The storage may be many gigabytes in size, or larger.

Since pipe networks are unpredictable and often filled with impediments, the robot may also include additional remedial subsystems to aid in location and recovery efforts should the robot fail. For example, if the autonomous robot becomes "stuck," its location may be determined by an onboard sound beacon and/or a low frequency ("cave radio") position signal and low bandwidth command and status communication. Moreover, a monofilament spooler may be used in known treacherous sections of the pipe network. Should the robot become trapped, the monofilament can be reeled in pull the robot safely out of harm's way.

Control System in Detail

Figure 5:
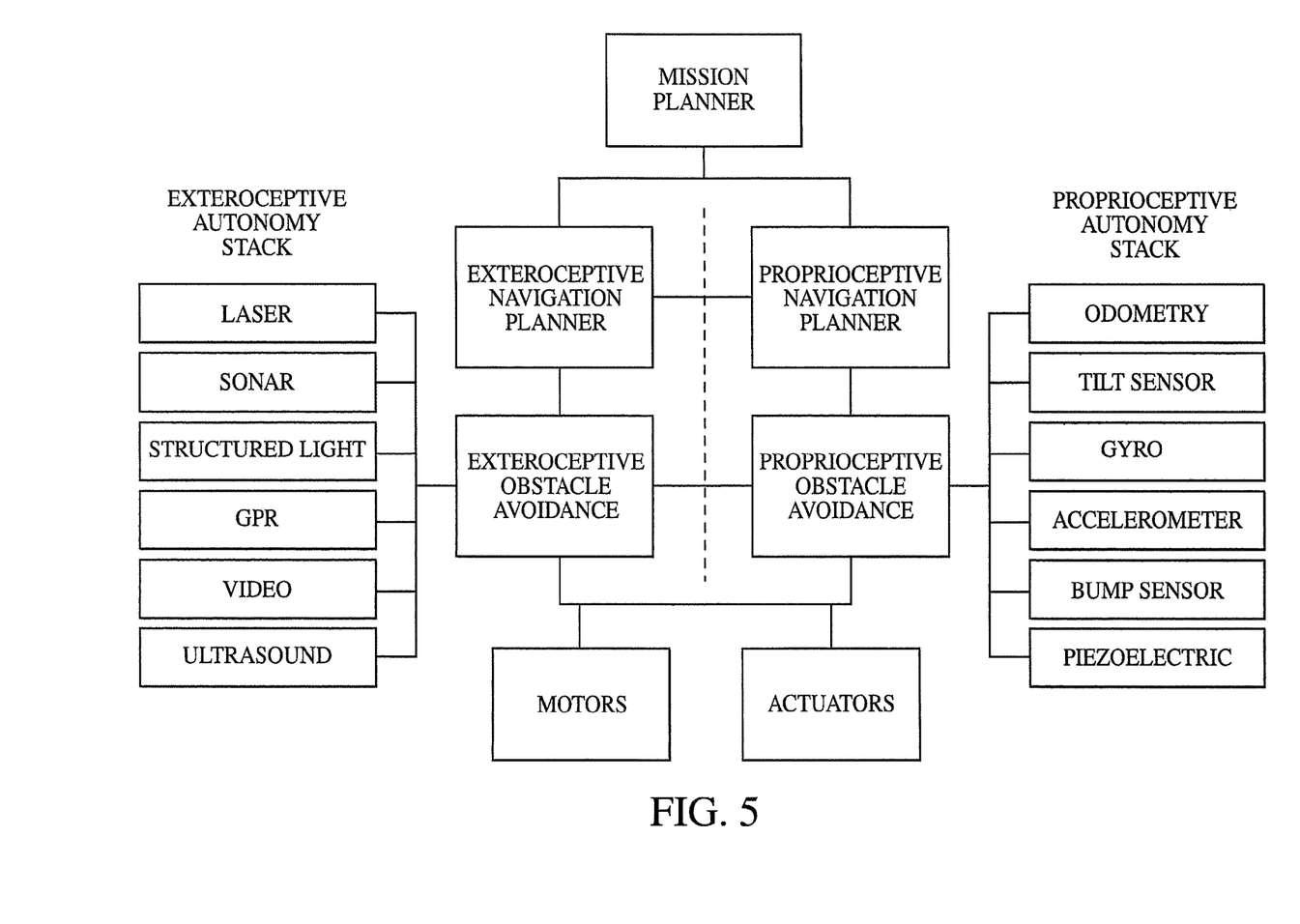
FIG. 5 is a block diagram detailing the major control functions of an inspector robot according to the present invention.

FIG. 5 details a block diagram of the major components of an exemplary control system for use onboard the autonomous inspector mobile platform robot of the present invention. In order to accommodate the multiple types of actuator and sensor devices that may be used with the robot, the control system is highly integrated and powerful. Power efficiency is highly weighted as battery power limitations will determine effective range and duration of autonomous inspection or surveillance runs. The computational demands of the robot are similar to a laptop computer, but the power efficiency requirements are much greater given the power demands of locomotion, lighting, sensors, etc.

The control system shown in FIG. 5 is adapted to satisfy these power and computational requirements while incorporating a high speed serial communications bus (FireWire) for rapid retrieval of high density image data from onboard storage and for remote teleoperation and real-time digital video. The controller may also be augmented with the resources of an FPGA for flexible interfacing to motion control and I/O peripherals.

Specifically, the control system of FIG. 5 emphasizes that the present invention can gather navigation-related data and plan alternative navigation paths from both exteroceptive (external world sensors) and proprioceptive (internal state sensors). Examples of both are provided in FIG. 5.

The methodology of FIG. 5 begins with the concept of a mission planner. Mission planning is the act of defining the goals for the robot during its deployment. For example, telling the robot to acquire panoramic images on three foot intervals and to map the first 500 ft of the pipe downstream and 1000 ft of the pipe upstream. Mission planning occurs on the topside (surface) and is downloaded to the robot. Mission plans may consist of single or multiple goals to be achieved.

The Navigation planners, which are alternatively shown in FIG. 5 as both an exteroceptive navigation planner and a proprioceptive navigation planner, are deliberative motion planners responsible for implementing the elements, or goals, contained within the mission plan. It is the job of the navigation planner to direct the robot through the environment until the first goal from the mission plan is achieved or the planner decides that it is not achievable. For example, assume the robot was supposed to map 500 ft of pipe but was unable to map the last 100 ft due to a pipe blockage. After the first goal is achieved or is rejected as unachievable, the entire set of mission goals is implemented in succession by the navigation planner. Navigation planning in pipes can occur by looking at the world and then deciding how the robot should move in that world model—this model is exteroceptive navigation. Another model, proprioceptive navigation, makes use of models of the robot internal state, to implement robot motion through the pipe. Either or both modes are possible through the use of the present invention.

The next portion of the FIG. 5 methodology is obstacle avoidance. Obstacle avoidance engines are reactive motion planners that are responsible for the "self preservation" behaviors of the system during motion. Obstacle avoidance prevents the robot from colliding with obstacles and assists the navigation planner in the implementation of the mission goals. Like navigation, obstacle avoidance can occur through exteroceptive or proprioceptive means.

The control system of the robot also must support a wide variety of features that comprise the total universe of potential applications for the AIMP. For example, high density, high resolution images and/or video require large amounts of storage space, even with compression techniques such as JPEG and MPEG that can be implemented on the controller. Compact Flash or SD non-volatile solid state storage is supported by the robot to provide removable, field upgradeable storage on site. In alternative embodiments, for example, a 50 mm hard drive may be utilized.

As described above, the control system of the autonomous inspector mobile platform robot contains a range of interfaces capable of supporting a wide variety of optional sensors and actuators without major modifications, other than the addition of software to exploit these interfaces and sensor data streams. In addition to a conventional address and data bus brought out through the FPGA, standard interfaces may include USB 1.1, RS-232, and $I^2C$ and SPI ports. Any of the following data interfaces may also be utilized by the present invention in optional embodiments depending on the intended use of the robot: 2 Multi-channel Buffered Serial Ports (McBSP); a synchronous serial interface, up to 50 Mbps @ 200 MHz; 22 free configurable FPGA digital I/O lines; a USB 1.1 (slave) port; an $I^2C$ interface—multi-drop for up to 64 devices; 4 channel 10 bit analog input; a JTAG emulator interface for interacting debugging/emulation; a real time clock (RTC) interface and power backup; and/or a 400 Mbps IEEE 1394a serial bus port.

Power management is of extreme importance in compact autonomous devices, and the controller manages power consumption and optimizes battery resources. For example, the hibernation of unused resources is a standard mode of operation to conserve power. Battery health and recharge status is reported on each recharge or download. The recharge system may be onboard or offboard, and may be powered from the FireWire port for convenience.

The control processor also includes the software necessary to run the robot. Preferably, the control processor has onboard boot FLASH (e.g., 8 MB) to allow for cold start of its real-time OS without connection to a host at the surface. This non-volatile storage also stores the executable application code for the baseline robot. Configuration dependent code modules and enhanced or updated code is downloadable through the onboard FLASH.

The controller code base is preferably built on a real-time, multi-tasking OS supported by a high level modular C compiler. Code development is accomplished offline or interactively with the hardware. Third party code modules for certain standardized functions such as JPEG and MPEG are available off-the-shelf for the processor, as are many other imaging, scientific and control libraries to support the development of the autonomous inspector application. The software architecture is premised on the ability to support all of the actuator, imaging, storage, and communication functions as a baseline. The software design will also support modular and incremental extension and improvement.

Pose and Odometry Measurement

For the robot of the present invention to effectively navigate autonomously in known or unknown environments, it must be able to track its motion and pose with respect to its surroundings. This data is also necessary to correlate data samples to each other (e.g., to produce an overall map of the pipe or pipe network). Several types of sensing options are available in different embodiments, and these sensors can be generally broken down into mechanical odometry, feature-based computed odometry, ground penetrating radar-based computed odometry, motion-based computed odometry, time-of-flight based odometry, and pose estimation. Each of these different sensor configurations will be described in detail below.

Mechanical odometry can be accomplished using either one or both of drive wheel encoders and a robot tether payout sensor. For the drive wheel encoder, a rotary sensor measures the rotation of the drive wheels of known radius (and therefore circumference), and the distance traveled can be computed directly therefrom. This is an easy methodology to implement, but it suffers from potential error and poor accuracy due to wheel slip in low traction environments.

Alternatively, to use a robot tether payout sensor, a tether with a spool rotary sensor or linear payout sensor is used to measure the distance traveled. A spool take-up motor maintains a slight tension in the tether for accurate distance measurement, and the spool may be onboard the robot or anchored within the pipe. If the spool is onboard the robot, the tether may be active or passive (no power or data) and will be anchored to the environment, possibly at the point of ingress into the pipe network, such as on the manhole cover affixed by a strong magnet. An onboard spool passive tether reduces the drag and snag issues that typically plague tethered robots. Alternatively, if the spool is offboard the robot, odometry will be measured at the spool and transmitted to the robot via the tether. In some embodiments, the tether may be used for emergency retrieval (pulling on the tether), and the tether spool may have a brake and serve as a safety line if the robot drives off an edge.

In addition to mechanical odometry, feature-based odometry can also be utilized. In this embodiment of the pose/odometry measurement, the robot locomotes down the pipe and can track its motion with respect to features that are observed in the robot's environment. These features may be inside or outside the pipe. For example, features that are commonly found inside pipes include lateral pipes, joints, manholes, reduction joints and defects such as cracks, collapses, roots, residue and debris. These features can be imaged and tracked with multiple sensing modes including: laser scanning, structured light, computer vision, and/or sonar for use in flooded pipes. Generally, this type of feature recognition is known in the art.

Ground penetrating radar can also be used for pose/odometry measurement. Features outside of the pipe and in the surrounding ground or substrate are also useful and can be imaged with an onboard ground penetrating radar. The radar scans the ground and produces a density profile which is processed by a computer to extract and track features. As the robot moves, the features will move within the scan and their motion will be measured to compute robot pose and odometry. Features that may be found in a density profile of the ground surrounding the pipe include rocks, sand, roots, voids, debris and other pipes.

In yet another alternative embodiment, motion-based computed odometry uses the Doppler frequency shift of emitted sonar and radar signals to track robot motion within a pipe. Several commercially available units exist and are currently utilized on submarines and other vehicles. Common examples of this type of device include a radar Doppler velocity logger and a sonar Doppler velocity logger for use in flooded pipes.

For time-of-flight (ToF) odometry, a "ping" emitter is placed at either or both ends of the pipe (e.g., at two adjacent manholes) to emit ping signals that are received by a ping sensor onboard the robot. The pings are synchronized with a timer on the robot so that it can measure the time-of-flight of the signals and use that information to determine the robot's distance from either pinger. The pings may be either light or sound.

Finally, a pose estimation algorithm may be used to determine robot orientation with respect to the pipe. In this embodiment, the robot needs to know its orientation to be able to navigate the pipe and correlate data samples with each other. Many pose sensors are available including: accelerometers to sense gravity's affect on the robot; gyroscopes, which sense the rotation of the robot; magnetometers which sense the orientation of the robot with respect to a magnetic field (i.e., the Earth's known field); and various types of tilt sensors which directly measure the movement of the robot with respect to the pipe as the robot traverses the pipe network (see FIG. 12).

The Pipe Inspection Process

1. Single (Main) Pipe Methods

The robot of the present invention can be used for a wide variety of pipe inspection and surveillance functions. Each of these inspection processes can also be performed in a variety of different ways. For example, both tethered and untethered inspection of main pipes and intersecting lateral pipes can be undertaken. In order to demonstrate the flexibility of the present invention, several of these various processes are explained in more detail below.

For inspection of a main pipe, the robot may be untethered or may be tethered in a variety of different manners. In one embodiment the tether is mechanical only and does not include an electrical or communications media. The robot 700 utilizes a mechanical tether 710 (see FIG. 7) to determine the odometry (distance) down a pipe 720 (as described above). The tether 710 may be passive (no power or data). Any of the computed odometry methods described above may be used to augment the mechanical odometry information. The robot 700 records data onboard and makes navigation decisions onboard. Power is also onboard the robot.

Figure 7:
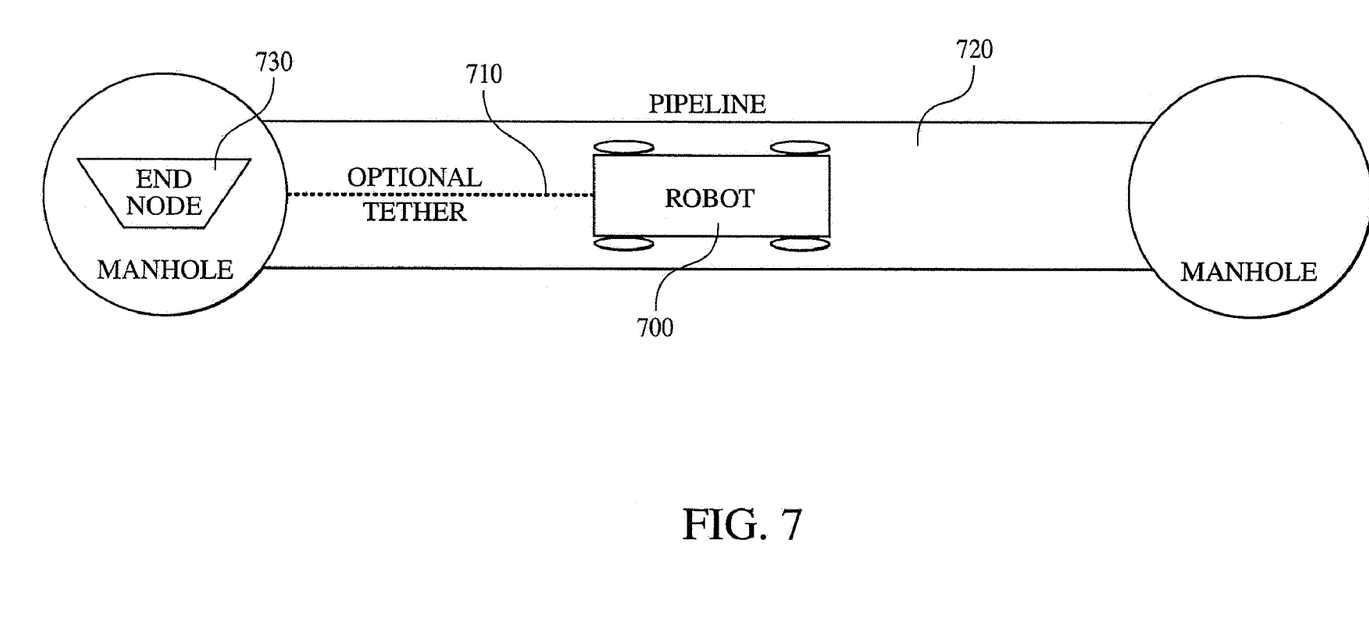
FIG. 7 shows an exemplary tether arrangement for use with an inspector robot within a single main pipe.

Alternatively shown in FIG. 7, the robot 700 could incorporate a communication only tether 710 to determine the odomtery (distance) down the pipe 720. Additional odometry may be determined by feature matching, structured light, or other similar methods. The robot may record data onboard and make navigation decisions onboard, and it can perform those computing functions at the end communication nodes 730 (offboard the robot). Power is still onboard the robot, and the tether may be payed out from a spool onboard the robot.

Alternatively, the tether 710 may include both communications and power signals. In this embodiment, the robot 700 uses a communication tether 710 to determine odometry (distance) down a pipe 720. Any of the computed odometry methods may be used to augment the mechanical odometry information. The robot 700 records data onboard and makes navigation decisions on board, and/or it can perform those computing functions at the end nodes 730 (offboard the robot). Power may be onboard or supplied to the robot from the end node through the power tether.

The robot may be untethered with no communication to the end nodes at all. In this embodiment, the robot locomotes down the pipe and uses any or all of the computed odometry methods described above to navigate the pipe and record its position. The robot records data onboard and makes navigation decisions on board as well. Power is supplied from onboard the robot.

Finally, the robot may be untethered but include communications with the end nodes. In this embodiment, the robot locomotes down the pipe and uses any or all of the computed odometry methods to navigate the pipe. The robot may also use a pinger for time-of-flight based odometry. The robot may record data onboard and make navigation decisions onboard, or the wireless communications means may be used to communicate with the end nodes so that these decisions can be made offboard. Independent power is available onboard the robot as well as at any of the end nodes.

2. Lateral Pipe Methods

Figure 8:
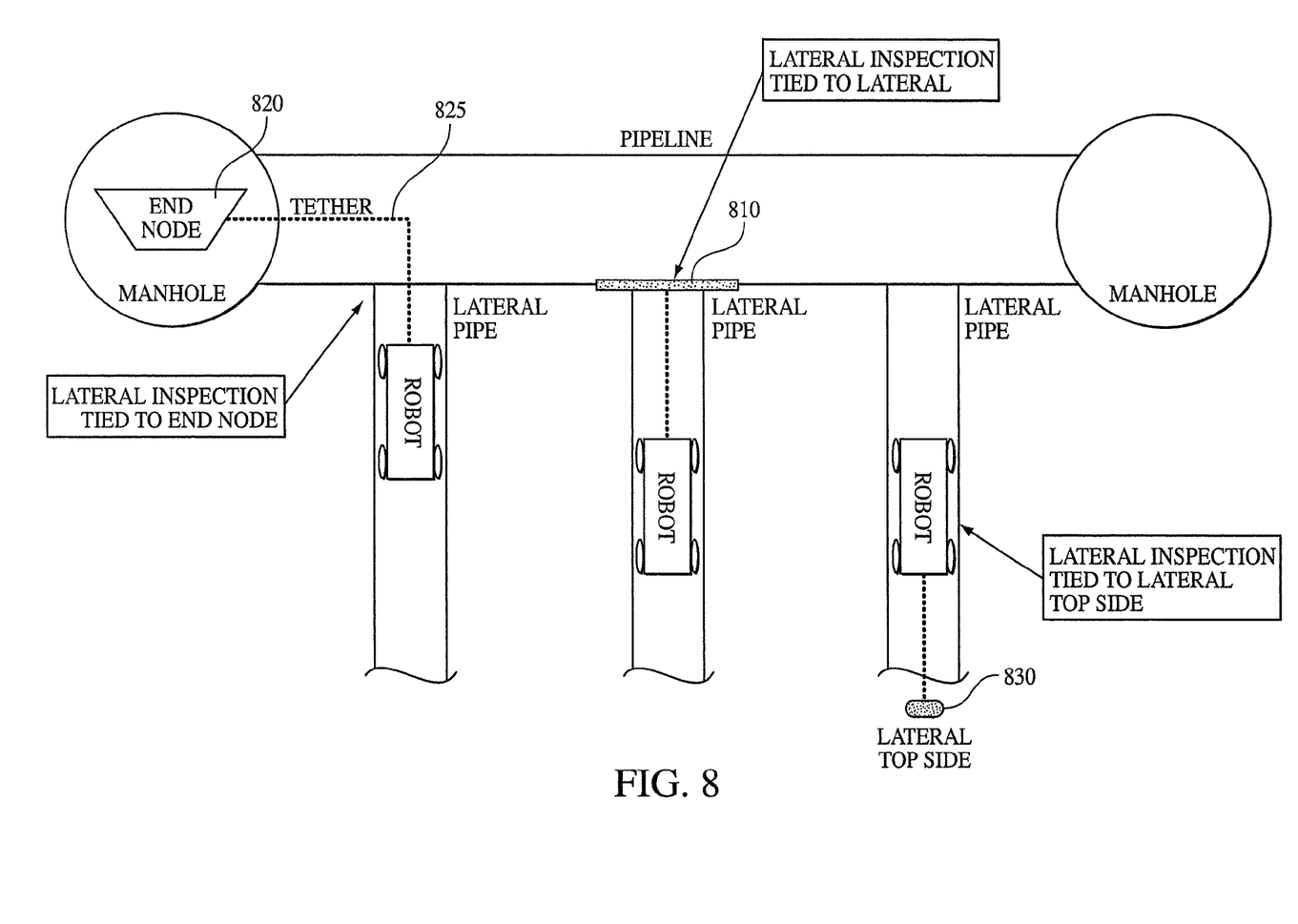
FIG. 8 shows three exemplary tether arrangements for use with an inspector robot within a lateral pipe.

There are many different ways in which one or two robots can be utilized to navigate through and inspect lateral pipes that intersect with the main pipe at some location. For example, a second smaller robot could be docked to the main inspector robot, and this second robot could be released into the lateral. For odometry, as shown in FIG. 8, the second "lateral" inspector robot could anchor a mechanical monofilament tether with a payout spool to the lateral opening 810 or to an end node 820 located proximate to the lateral opening. This mechanical tether 825 can then be used in a similar fashion to those described above, and the power and data storage occurs on board the robot.

Likewise, a "lateral" inspection robot may be inserted directly into a lateral pipe from the surface. In this example, the mechanical tether 840 would be tied to the lateral opening 830 at the surface, as shown in the third lateral (right side) of FIG. 8.

As described above with respect to the single (main) pipe, the mechanical tether could be replaced with a communication only tether, a communication and power tether, or the tether could be completely removed with the robot still being in communication with an end node or top side via conventional communications techniques. In short, each of the various methods described above with respect to the main (FIG. 7) can be translated and applied to a lateral pipe network as shown in FIG. 8.

3. Robot Retrieval Modes

If the robot completes a run successfully and reaches the end manhole (or other point of egress), the robot preferably waits for the retrieval at that point or is programmed to return to the ingress manhole for collection by the operator. However, if the robot reaches a blockage or for some other reason is not able to complete its run, the robot is preferably programmed to return to the ingress manhole while re-spooling its tether (if the robot is tethered at all) and wait for removal. By waiting at the end manhole, the robot saves power and reduces recharge time for subsequent deployments, but it will be necessary to have sufficient battery capacity to return to the ingress point in case a blockage is reached near the endpoint in the run. Having separate ingress and egress locations also requires the technician to visit both manholes, the first to disconnect the tether anchor (if applicable) and the second to retrieve the robot. Programming the robot to return to the ingress manhole is thus preferred.

Example of the Robot in Use

The use of the robot of the present invention to inspect a pipe network begins with deployment. A truck carrying the robot arrives at the ingress manhole. Proper optional attachments (e.g., wheels (FIG. 3), WHEGS (FIG. 4)) and a tether/spool (if applicable) are attached to the robot. The robot is then plugged into a laptop computer (docking station) to recharge the robot, to enter manhole and relevant inspection segment and operator data, and to perform a diagnostic check on the robot. The manhole cover is removed, the autonomous robot process is initiated and the robot is lowered into the pipe. After verifying that the robot is "inspecting" properly, the tether can be attached to the manhole cover (if applicable) and the manhole cover can be replaced. The operator is then free to begin additional inspection processes utilizing additional robots.

Once initiated, the robot begins recording pipe inspection according to its software. Navigation is determined and the robot steers to avoid obstacles. If the robot gets stuck after several attempts to move, the robot reverses its direction and returns to its point of ingress. If no blockage is encountered, the robot continues down the pipe gathering image data (preferably digital data that can be compressed into JPEG or MPEG on the fly) until it reaches the end of its run. Either at this location, or after return to its point of ingress, the robot preferably awaits retrieval by the operator.

For retrieval, after a prescribed amount of time, the operator pulls the truck to the egress manhole and removes the manhole cover. Here, the operator retrieves the robot or determines that an emergency retrieval process is needed because the robot got stuck during its run. Once retrieved, the robot is again connected to the laptop computer and the image data is downloaded to the computer. The success or failure of the run is verified by the software, and the manhole cover is returned to place. At this time or at a later time, the image data can be processed into a complete image of the interior of the pipe, and the resulting image can be reviewed by the operator or a software-based detection algorithm.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method, implemented by an autonomous robot, for inspecting an interior of a sewer pipe, the method comprising:

a) capturing information about the interior of the sewer pipe via at least one sensor;
b) storing data representative of the captured information;
c) determining a position of the autonomous robot in the sewer pipe;
d) relating the determined position to the stored data;
e) traversing through the sewer pipe, while performing steps (a)-(d), wherein traversing through the sewer pipe comprises traversing based on the captured information, and wherein at least steps (a)-(b) and (e) are performed automatically by the autonomous robot; and
f) utilizing a tether connected to the autonomous robot to determine a distance traveled by the autonomous robot.

2. The method of claim 1, wherein capturing the information comprises capturing the information based on a mission plan stored onboard the autonomous robot.

3. The method of claim 1, wherein capturing the information comprises capturing an image of the interior of the sewer pipe.

4. The method of claim 3, wherein capturing the image comprises capturing a plurality of images.

5. The method of claim 4, wherein capturing the plurality of images comprises capturing the respective images at periodic intervals.

6. The method of claim 4, further comprising generating an unwrapped image of the sewer pipe.

7. The method of claim 6, wherein generating the unwrapped image comprises automatically stitching together at least two of the captured plurality of images.

8. The method of claim 1, wherein capturing the information comprises capturing a sound associated with a condition in the interior of the sewer pipe.

9. The method of claim 8, wherein capturing the sound comprises capturing a plurality of sounds associated with the interior of the sewer pipe.

10. The method of claim 9, wherein capturing the plurality of sounds comprises capturing the respective sounds at periodic intervals.

11. The method of claim 1, wherein capturing the information comprises capturing information about a configuration of the interior of the sewer pipe.

12. The method of claim 11, wherein capturing the configuration information comprises capturing information about the configuration of the interior of the sewer pipe at periodic intervals.

13. The method of claim 1, wherein capturing the information comprises capturing information about an elevation of the interior of the sewer pipe.

14. The method of claim 13, wherein capturing the elevation information comprises capturing information about the elevation of the interior of the sewer pipe at periodic intervals.

15. The method of claim 1, wherein capturing the information comprises capturing at least two of the following:
   an image of the interior of the sewer pipe;
   a sound associated with a condition in the interior of the sewer pipe;
   information about a configuration of the interior of the sewer pipe; and
   information about an elevation of the interior of the sewer pipe.

16. The method of claim 1, wherein traversing through the sewer pipe comprises traversing based on a mission plan stored on board the autonomous robot.

17. The method of claim 1, wherein traversing through the sewer pipe comprises changing a direction of travel of the autonomous robot based on the captured information.

18. The method of claim 1, wherein traversing through the sewer pipe comprises traversing to a predetermined location when the captured information is indicative of a blockage in the sewer pipe.

19. The method of claim 1, further comprising digitizing the captured information, wherein the digitizing is performed automatically by the autonomous robot.

20. The method of claim 1, further comprising compressing the data before storing the data, wherein the compressing is performed automatically by the autonomous robot.

21. The method of claim 1, further comprising transmitting the stored data to a device which is external to the autonomous robot.

22. The method of claim 1, wherein utilizing the tether comprises utilizing a passive tether.

23. The method of claim 1, wherein utilizing the tether comprises utilizing an active tether.

24. The method of claim 1, further comprising utilizing the tether for retrieval of the autonomous robot from the sewer pipe.

25. The method of claim 1, wherein steps (c) and (d) are performed automatically by the autonomous robot.

* * * * *